United States Patent
Law et al.

(10) Patent No.: US 7,231,451 B2
(45) Date of Patent: Jun. 12, 2007

(54) TRANSMIT-ONLY AND RECEIVE-ONLY BLUETOOTH APPARATUS AND METHOD

(75) Inventors: Hock Law, Carlsbad, CA (US); Dennis Kwan, San Diego, CA (US)

(73) Assignee: Microtune (San Diego), Inc., San Diego, CA (US)

( * ) Notice: Subject to any disclaimer, the term of this patent is extended or adjusted under 35 U.S.C. 154(b) by 837 days.

(21) Appl. No.: 09/851,727

(22) Filed: May 8, 2001

(65) Prior Publication Data

US 2001/0056501 A1 Dec. 27, 2001

Related U.S. Application Data

(60) Provisional application No. 60/203,255, filed on May 8, 2000, provisional application No. 60/203,127, filed on May 8, 2000.

(51) Int. Cl.
*G06F 15/16* (2006.01)
*H04B 7/00* (2006.01)

(52) U.S. Cl. ............... 709/230; 455/41.2; 455/502

(58) Field of Classification Search ............ 345/349; 434/307; 395/200.32; 709/230; 455/41.2, 455/502

See application file for complete search history.

(56) References Cited

U.S. PATENT DOCUMENTS

| | | | | |
|---|---|---|---|---|
| 4,528,661 | A * | 7/1985 | Bahr et al. ............... | 370/400 |
| 5,706,278 | A * | 1/1998 | Robillard et al. ......... | 370/222 |
| 6,356,945 | B1 * | 3/2002 | Shaw et al. ............... | 709/231 |
| 6,792,247 | B2 * | 9/2004 | Law et al. ................ | 455/41.2 |
| 6,894,975 | B1 * | 5/2005 | Partyka ..................... | 370/235 |
| 2002/0089548 | A1 * | 7/2002 | Marler et al. ............ | 345/810 |

FOREIGN PATENT DOCUMENTS

| | | |
|---|---|---|
| EP | 1 143 666 A2 | 10/2001 |
| WO | WO 01-54300 A2 | 7/2001 |

OTHER PUBLICATIONS

International Searching Authority; "International Search Report"; PCT/US01/40701; Jul. 9, 2002.
Haartsen J.; "bluetooth-the Universal Radio Interface for AD HOC, Wireless Connectivity"; Ericssion Review, Reicssion. Stockholm, SE; No. 3; 1998; pp. 110-117.

* cited by examiner

*Primary Examiner*—William Vaughn
*Assistant Examiner*—J. Bret Dennison
(74) *Attorney, Agent, or Firm*—Baker Botts L.L.P.

(57) ABSTRACT

A transmit-only Bluetooth-compatible apparatus is described comprising: a protocol stack compatible with the Bluetooth protocol standard, the protocol stack including selected portions of the Bluetooth protocol used only for transmitting data; and a transceiver communicatively coupled to the protocol stack and configured to physically transmit the data.

Also described is a receive-only Bluetooth-compatible apparatus comprising: a protocol stack compatible with the Bluetooth protocol standard, the protocol stack including selected portions of the Bluetooth protocol used only for receiving data; and a transceiver communicatively coupled to the protocol stack and configured to physically receive the data.

Also described is a method comprising: generating a transmit-only Bluetooth protocol stack by removing elements of a standard Bluetooth protocol stack related to receiving data; and configuring the transmit-only Bluetooth protocol stack in a transmit-only wireless device for transmitting data.

33 Claims, 7 Drawing Sheets

FIG. 2 (*prior art*)

TRANSMIT-ONLY AND RECEIVE-ONLY BLUETOOTH APPARATUS AND METHOD

This application claims the benefit of U.S. Provisional Application No. 60/203,255 filed May 8, 2000 and U.S. Provisional Application No. 60/203,127 filed May 8, 2000.

BACKGROUND OF THE INVENTION

1. Field of the Invention

This invention relates generally to voice and data communication systems, and more particularly to wireless transmission protocols.

2. Description of the Related Art

Bluetooth is a short-range radio standard intended to replace the cables connecting portable and fixed electronic devices. The standard, which operates in the unlicensed Industrial-Scientific-Medical ("ISM") band at 2.4 GHz, focuses on robustness, low complexity, low power, and low cost. A frequency-agile or frequency "hop" protocol is applied to provide security and limit interference, and a shaped, binary FM modulation is used to minimize transceiver complexity. A symbol rate of 1 Ms/s, is maintained with a slotted channel having a nominal slot length of 0.625 msec.

For full duplex transmission, a Time-Division Duplex ("TDD") scheme is implemented. Under a TDD scheme the same channel is broken into time slots, with specified time slots used for transmitting and others for receiving. Information is exchanged through data packets which typically cover a single slot, but which may be extended to cover up to five slots, depending on the application. Additional features of the Bluetooth standard are described in Jaap Haartsen, *Bluetooth—The Universal Radio Interface for ad hoc, Wireless Connectivity*, ERICSSON REVIEW No. 3, (1998).

Referring to FIG. 1, the "Bluetooth" specification is comprised of several different protocol layers including a radio frequency ("RF") layer 160, a baseband layer ("BB") 150, a link control layer ("LC") 140, a link manager layer ("LM") 130, a logical link control and adaptation protocol layer ("L2CAP"), and a serial line emulation layer ("RF-COM"). The functionality of each of these layers (as well as additional Bluetooth protocol layers) is described in detail in *Bluetooth Protocol Architecture*, Version 1.0 (Aug. 25, 1999) ("*Bluetooth Protocol Architecture*"), which can be found at "http://www.bluetooth.com."

Because Bluetooth is defined as a bidirectional protocol, devices are typically required to have both a receiver and a transmitter in order to comply with the Bluetooth standard (i.e., the Bluetooth protocol assumes bi-directional signaling for all devices in a Bluetooth network, referred to as a "piconet"). However, a number of potential Bluetooth devices (e.g., keyboards, mice, microphones, speakers, ear pieces, . . . , etc) are not bidirectional in nature. The applications these devices support exist only as data sources or as data sinks. For example, wireless input devices such as a wireless keyboards are typically only required to transmit data. Similarly, wireless output devices such as wireless audio ear pieces or wireless video monitors are typically only required to receive data. Accordingly, from an application standpoint, these devices only require unidirectional communication.

What is needed is a system and method for providing unidirectional communication between wireless devices when bidirectional communication is unnecessary. What is also needed is a system and method for synchronizing data transmission between wireless devices when unidirectional communication is implemented. What is also needed is a system and method which will work seamlessly with the Bluetooth protocol.

SUMMARY OF THE INVENTION

A transmit-only Bluetooth-compatible apparatus is described comprising: a protocol stack compatible with the Bluetooth protocol standard, the protocol stack including selected portions of the Bluetooth protocol used only for transmitting data; and a transceiver communicatively coupled to the protocol stack and configured to physically transmit the data.

Also described is a receive-only Bluetooth-compatible apparatus comprising: a protocol stack compatible with the Bluetooth protocol standard, the protocol stack including selected portions of the Bluetooth protocol used only for receiving data; and a transceiver communicatively coupled to the protocol stack and configured to physically receive the data.

Also described is a method comprising: generating a transmit-only Bluetooth protocol stack by removing elements of a standard Bluetooth protocol stack related to receiving data; and configuring the transmit-only Bluetooth protocol stack in a transmit-only wireless device for transmitting data.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Figure 1:
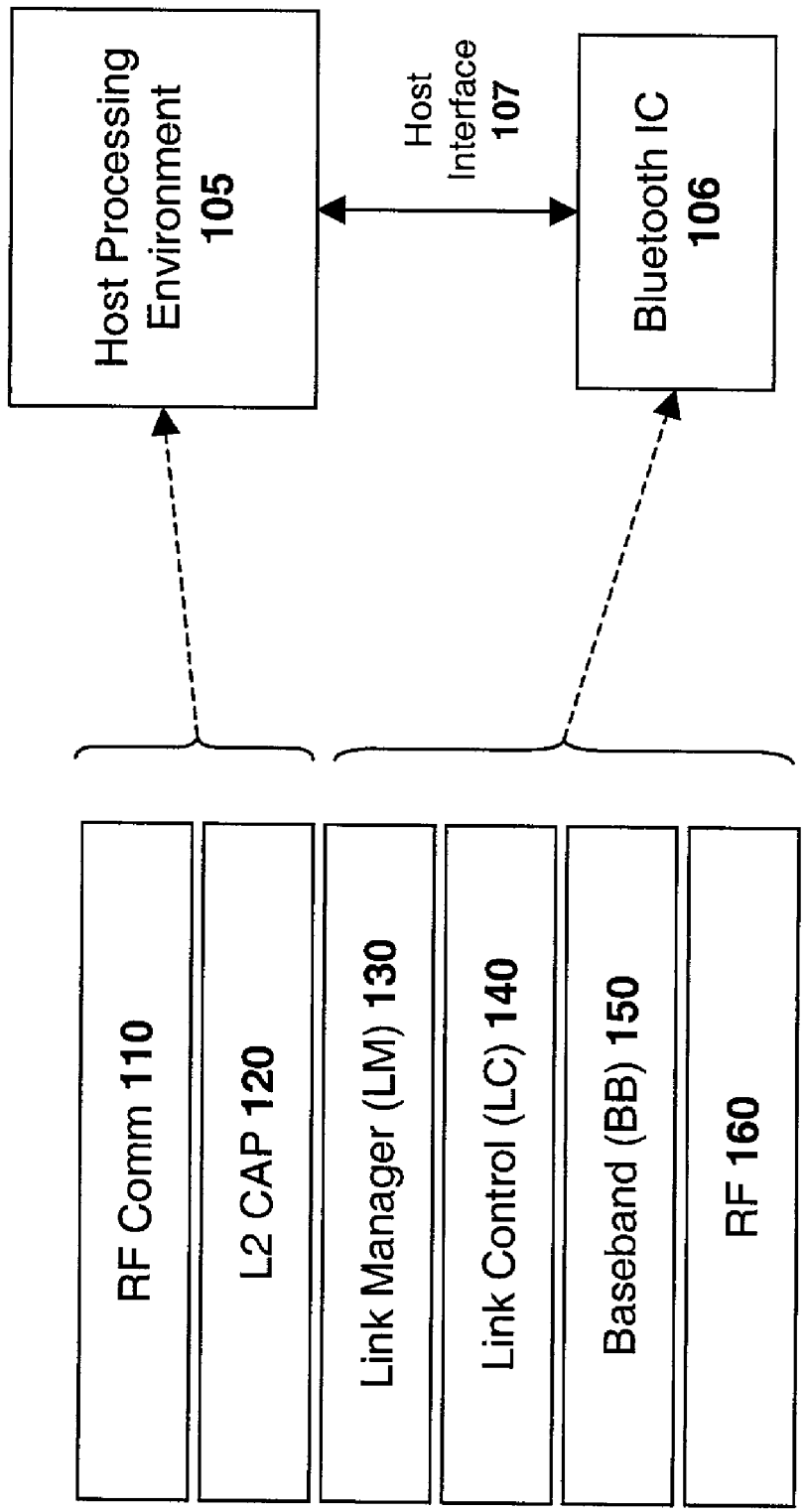
FIG. 1 illustrates a typical allocation of a Bluetooth protocol stack between a host processing environment and a Bluetooth IC.
Figure 2:
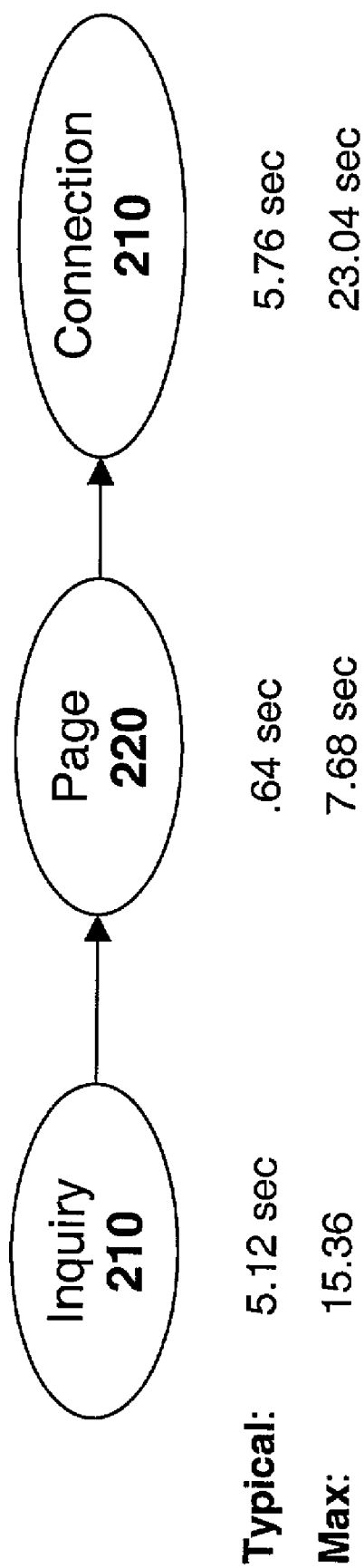
FIG. 2 illustrates various steps and associated timing required to establish communication between two Bluetooth devices.

In a typical configuration, Bluetooth "slave" devices enter standby mode and loose sync with the network clock (i.e., the "master" device's clock) in order to save power, trading responsiveness for power savings. For example, as illustrated in FIG. 2, in order to reestablish a connection, the slave device invokes an "inquiry" procedure 210 to obtain the identity of the other devices within it's transmission range. Under this procedure, the slave device transmits packets containing an inquiry access code common to all Bluetooth devices over specified inquiry access carriers. As indicated, this procedure takes 5.12 seconds on average and can take as long as 15.36 seconds.

When another device (e.g., the master device) receives the inquiry, it transmits a page packet containing it's identity code and clock to the slave device. As shown, the time required for the slave device to receive each response is 0.64 seconds on average and can take as long as 7.68 seconds. Accordingly, the total average time required to reestablish a communication channel is 5.67 seconds and, in some situations, as long as 23.04 seconds. This is an unacceptable response delay for numerous potential Bluetooth applications (e.g. wireless keyboards, wireless mice, etc).

One potential mechanism for solving the foregoing problem with response time is to require the slave device to maintain synchronization with the network clock (i.e., by receiving and transmitting periodically). This requirement, however, consumes excess energy, potentially draining limited battery power without directly servicing the needs of the appliance; or, alternatively, requires that a potentially impracticably large energy reserve be built into the product.

Embodiments of the Invention

Embodiments of the invention described below provide a more efficient, cost effective solution for configuring Bluetooth devices. These embodiments are capable of remaining active for extended periods of time using limited energy sources while at the same time providing improved response times when establishing network communication channels.

Figure 3:
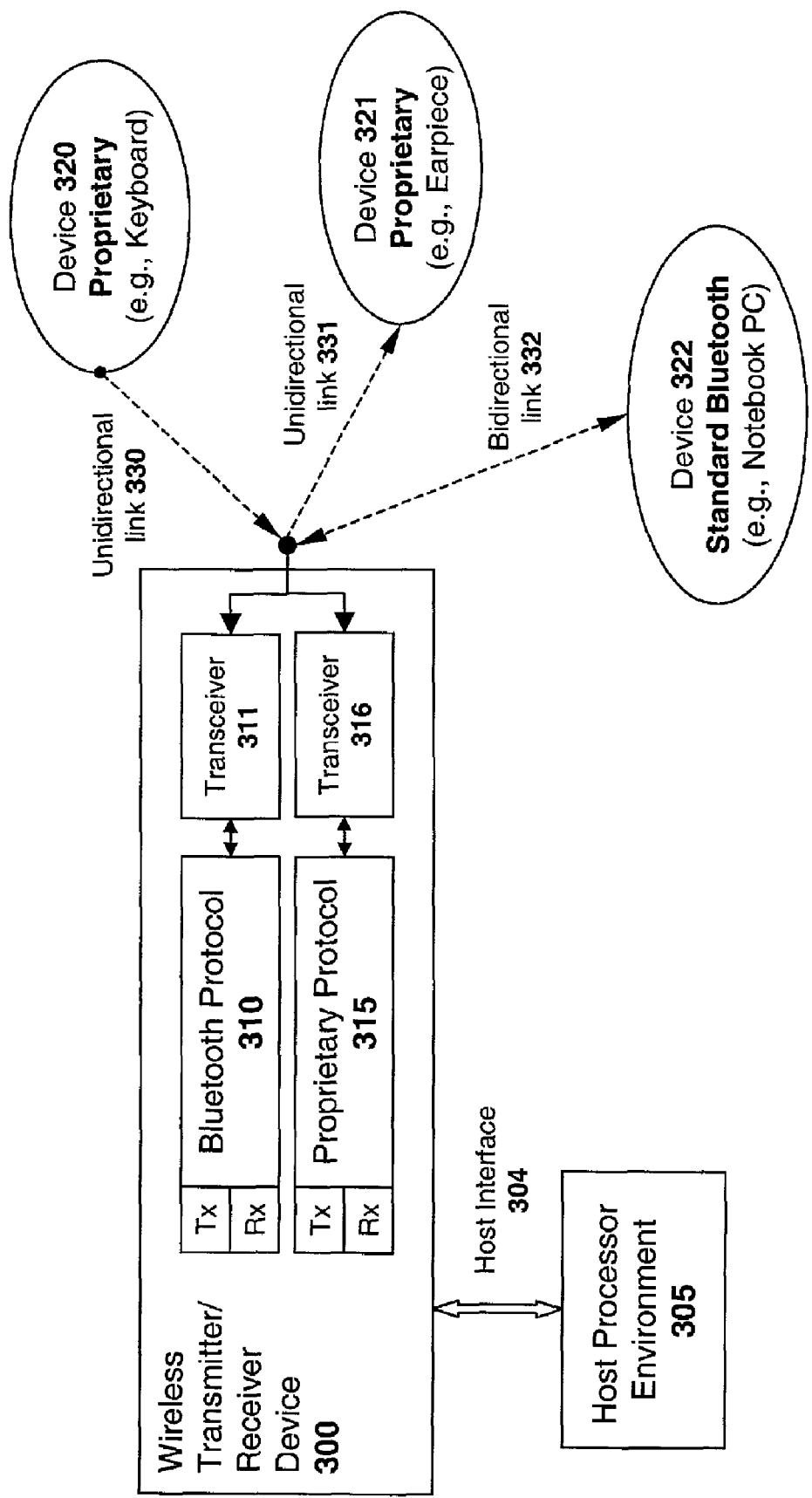
FIG. 3 illustrates one embodiment of a co-located frequency-agile transmitter.

As illustrated in FIG. 3, one embodiment of the invention is comprised of a proprietary protocol stack 315 (including a transmitter and receiver pair) operating in parallel with the Bluetooth protocol stack 310. As will be described in detail below, the proprietary protocol stack 315 in one embodiment operates in a mode that does not require continuous synchronization between wireless devices (as does the Bluetooth protocol). Also included in this embodiment are a pair of transceivers 311 and 316, through which the wireless transmitter/receiver device 300 communicates to one or more other wireless devices 320–322.

Each of the protocol stacks 310 and 315 and associated transceivers 311 and 316 may communicate using a frequency-agile protocol in which data packets are transmitted in sequential time slots at different frequencies (portions of the Bluetooth frequency-agile protocol are described above). In one embodiment, each of the transceivers 311, 316 operate within overlapping frequency bands but subscribe to different orthogonal signaling algorithms. The transceivers 311, 316 and the protocol stacks 310, 315 in one embodiment operate independently, sharing components as appropriate within the respective wireless device 300.

In one embodiment, the device 300 may interface with a host processor environment 305 (e.g., a general purpose processor such as a Pentium®-class processor running an operating system such as WindowsNT®) over a host processor interface 304. The wireless transmitter/receiver device 300 may be configured to communicate with the host processor environment 305 by physically interfacing with various proprietary buses or industry standard buses such as, for example, the Universal Serial Bus ("USB"), a Peripheral Component Interconnect Bus ("PCI"), or an Industry Standard Architecture bus ("ISA"). It should be noted, however, that the underlying principles of the invention are not limited to any particular bus configuration.

As illustrated in FIG. 3, one embodiment of the invention is capable of communicating with wireless devices which support the standard Bluetooth protocol (e.g., device 322) as well as devices that support a proprietary protocol (e.g., devices 320 and 321). Other devices (not shown) may be configured to operate with either both the standard Bluetooth protocol 310 and the proprietary protocol 315, depending on the circumstances. For example, a device may be configured to communicate using the standard Bluetooth protocol when actively communicating with the wireless transmitter/receiver device 300 but may switch to the proprietary protocol when operating in "standby" mode (i.e., not actively communicating). In this embodiment, once the device leaves standby mode, the wireless transmitter/receiver device 300 may coordinate the switch from the proprietary protocol 315 to the Bluetooth protocol 310.

Embodiments of the Proprietary Protocol

Figure 4:
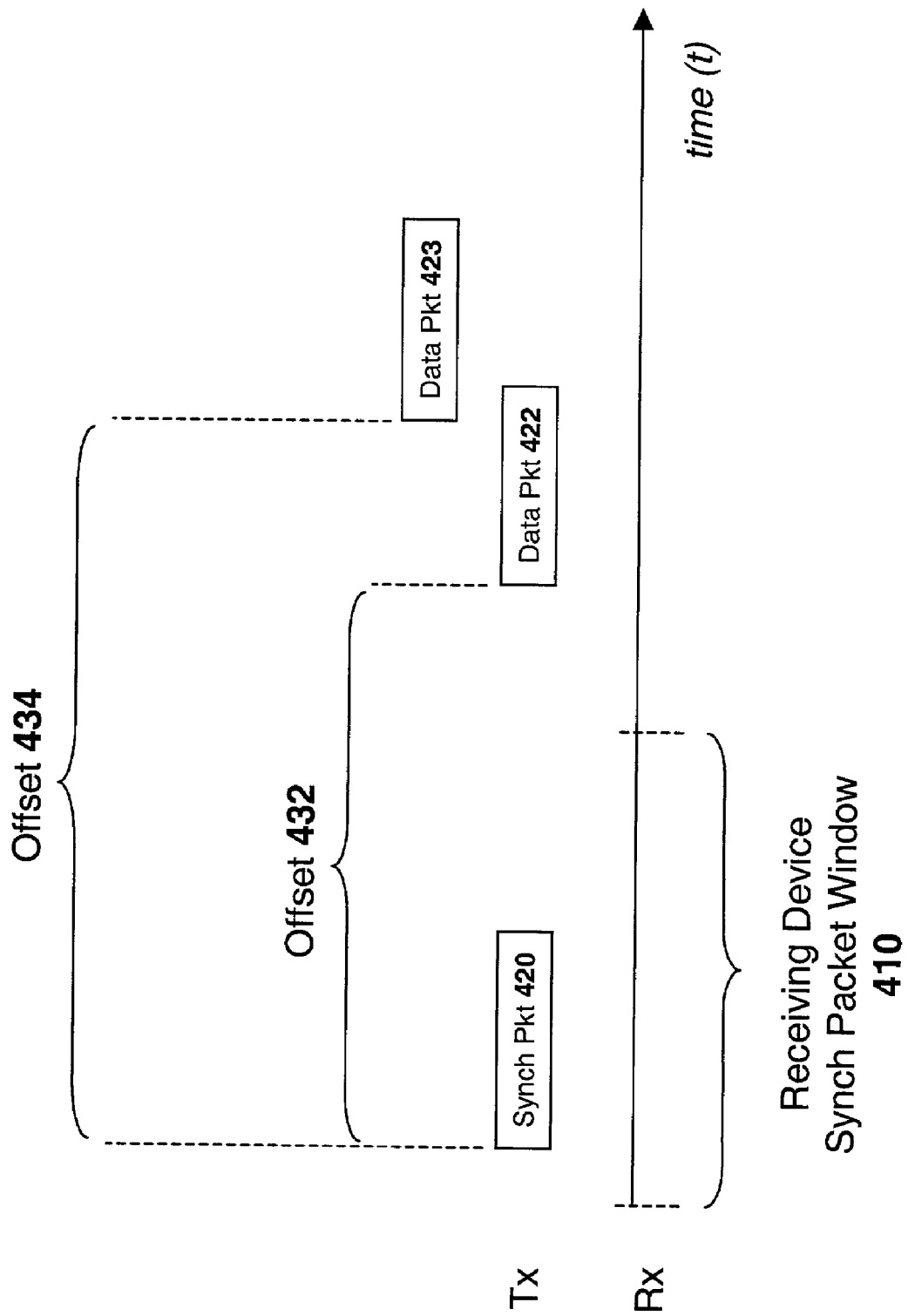
FIG. 4 illustrates timing between synch packets and data packets in one embodiment of the invention.

One embodiment of a proprietary protocol 315 will now be described with respect to FIG. 4. According to this embodiment, when a wireless external device such as a wireless keyboard (e.g., device 320 in FIG. 3) or mouse is ready to transmit data (e.g., in response to a user action), it initially transmits a synchronization packet 420. In one embodiment, the receiving device (e.g., the wireless transmitter/receiver 300 of FIG. 3) periodically allocates a timing window 410 within which it listens for synchronization packets 420 transmitted from other devices. Once it detects the synchronization packet 420, it then listens for a data packet 422 following the synchronization packet 420 by a specified offset 432. The data packet 422 contains the underlying data to be processed by the receiving device 300 and/or the host processor.

In one embodiment, the receiving device 300 uses the offset 432 between the synchronization packet 420 and the data packet 422 to identify the wireless device which transmitted the data packet. For example, the receiving device may maintain a lookup table in memory which links timing offsets to various device addresses. Thus, referring to FIG. 4, the receiving device may identify data packet 422 as originating from a wireless keyboard based on the offset 432 between the packet 422 and the synchronization packet 420 and may similarly distinguish data packet 423 as originating from the wireless mouse based on offset 434.

Alternatively, or in addition, the offsets 432 and 434 may be used to identify the type of data being transmitted by the wireless device. For example, the data packets 422 and 423 may originate from the same wireless device and the offsets 432 and 434, respectively, may identify a characteristic of the data being transmitted (e.g., data may be defined as low priority, medium priority, high priority, . . . , etc).

It will be appreciated that the foregoing embodiments allow multiple devices to communicate with one another over a wireless network with minimum latency and without the need for continually maintaining clock synchronization with one another. For example, a keyboard employing this technology may sit idle for days, out of synch with the transmitter/receiver device 300. However, as soon as a user selects a key, a synchronization packet 420 is sent to the wireless transmitter/receiver 300 (which listens for the synch packet 420 within the synch packet window 410). The transmitter/receiver 300 may then identify the keyboard based on the offset 432 between the synchronization packet 420 and the data packet 422.

In one embodiment, the wireless device transmits synchronization packets 420 to the transmitter/receiver device 300 periodically. While there are no minimum or maximum transmission rates, in one embodiment data bursts from the wireless device may be as frequent as 10 transmissions per second (e.g., 100 ms per key on a keyboard).

Frequency Hopping and Time Diversity

Many devices operate in the microwave spectrum (i.e., 1 GHz and above) including microwave ovens, communications satellites, Personal Communications Services ("PCS") cellular systems and wireless LANs. As such, Bluetooth devices which operate within this same frequency range (i.e., 2 GHz), may be particularly susceptible to interference.

Figure 5:
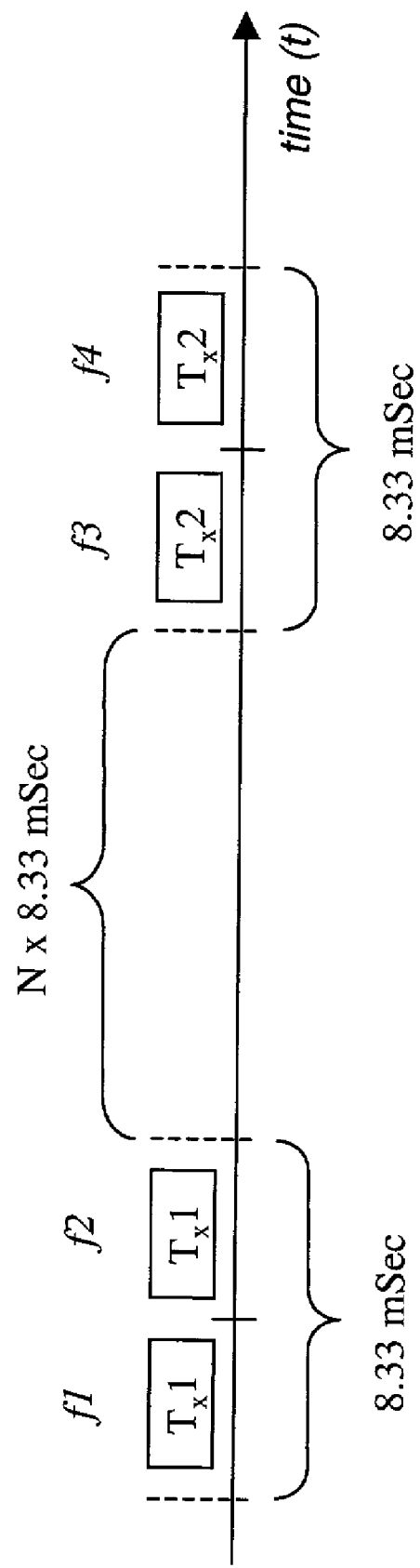
FIG. 5 illustrates additional timing features implemented in embodiments of the invention.

One embodiment of the invention directed at limiting microwave interference is illustrated in FIG. 5. This embodiment defines transmission windows of 8.66 msec based on a typical microwave device duty cycle of 50%. (An oven typically has an active period of approximately 8.66 msec, followed by a quiescent period of approximately 8.66 msec.) Within each 8.33 msec quiescent period there is a transmission window, in which data packets are transmitted twice, thereby improving the likelihood that one of the two packets will make it through to its destination.

Thus, as illustrated in FIG. 5, packet $T_x1$ is transmitted twice within the first 8.33 msec window and packet $T_x2$ is transmitted twice within the second 8.33 msec transmission window. In this particular embodiment, each of the 8.33 msec windows is separated by a window which is a multiple 'N' of the transmission window (e.g., 2×8.33 msec, 3×8.33 msec, . . . , etc). The multiple 'N' may be based the particular offsets 432, 434 configured into the system (i.e., the multiple may represent the difference between the offsets 432, 434). In addition, to further limit interference, in one embodiment the various data packet transmissions occur at a different hop frequencies f1, f2, f3 and f4.

Transmit Only and Receive-only Devices

Figure 6:
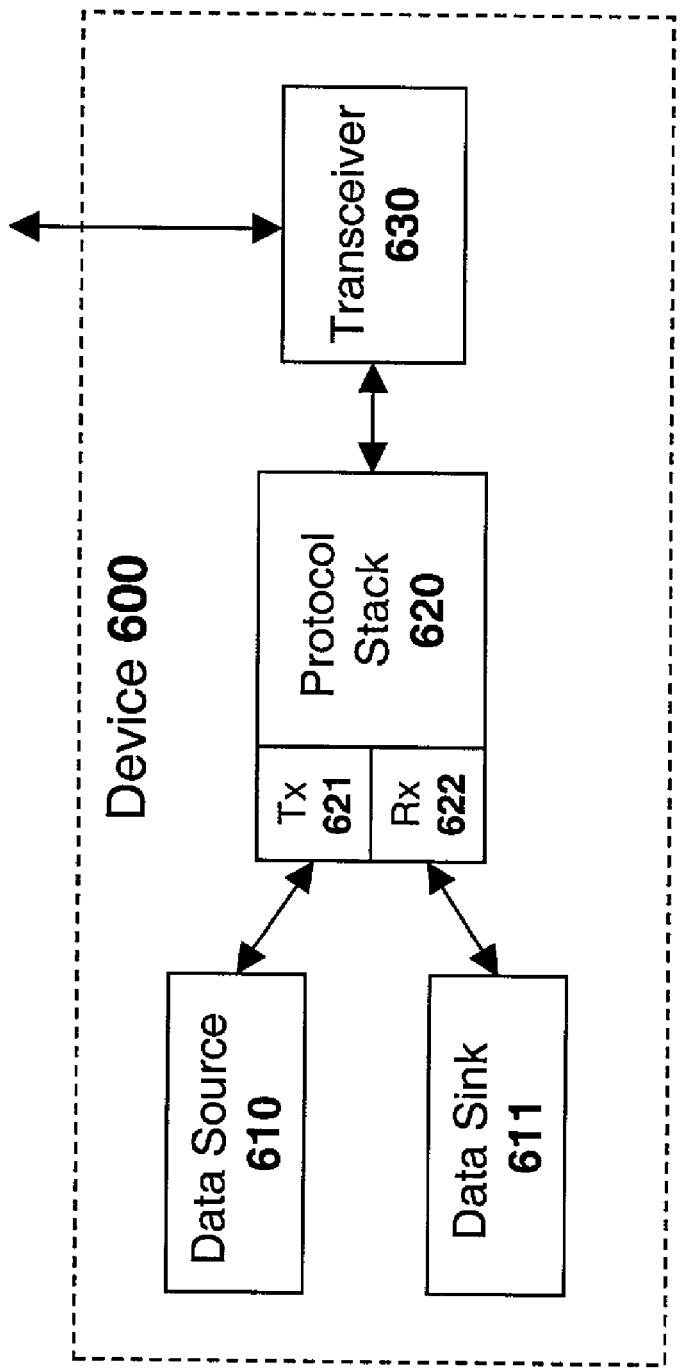
FIG. 6 illustrates a typical Bluetooth-enabled device including both a data source and a data sink.

A typical Bluetooth device 600 is illustrated in FIG. 6. The device 600 includes both a data source 610 and a data sink 611 which communicate through the Bluetooth protocol stack 620 (including transmit and receive protocol elements 621 and 622). A transceiver unit 630 provides the physical or RF layer functionality for transmitting and receiving data over wireless channels according to the Bluetooth specification.

As described above, certain applications require only a unidirectional transmission capability. For example, as illustrated in FIG. 3, an input-only device 320 such as a keyboard is inherently a data source (i.e., it is only required to generate data and not receive data). Similarly, an output-only device 321 such as a video monitor or an audio ear-piece are inherently data sinks (i.e., they are only required to receive data). For these applications, the typical Bluetooth implementation shown in FIG. 6 is inefficient.

Figure 7A:
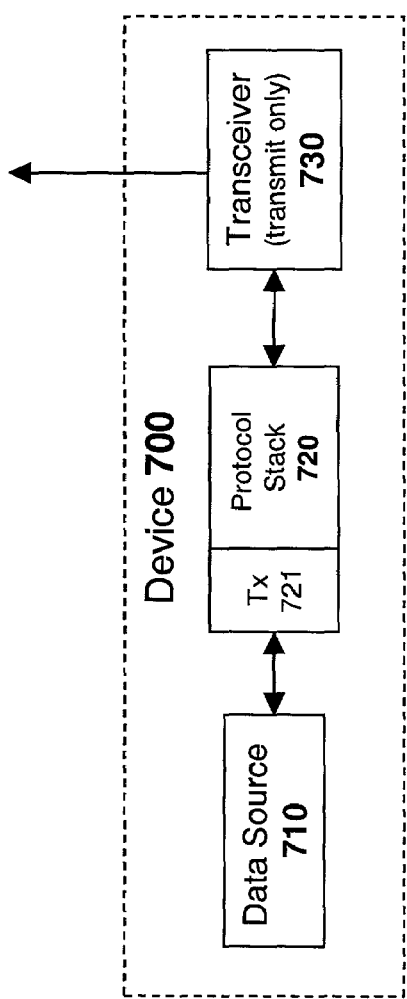
FIG. 7*a* illustrates one embodiment of the invention including a transmit-only Bluetooth device.

Referring to FIG. 7a, a wireless device 700 according to one embodiment of the invention is comprised of a data source 710 and a protocol stack 720 for supporting the data source 710 (including a data transmission component 721). In addition, in one embodiment, the transceiver 730 is configured as a transmit-only transceiver (i.e., it is only capable of transmitting data and not receiving data). Because all unnecessary hardware and software (i.e., hardware and software associated with receiving data) are removed from the embodiment illustrated in FIG. 7a, significant cost savings are realized. In addition, because the hardware footprint and memory requirements for the device are significantly reduced, the device can be manufactured using a more compact printed circuit board ("PCB")/enclosure design.

Figure 7B:
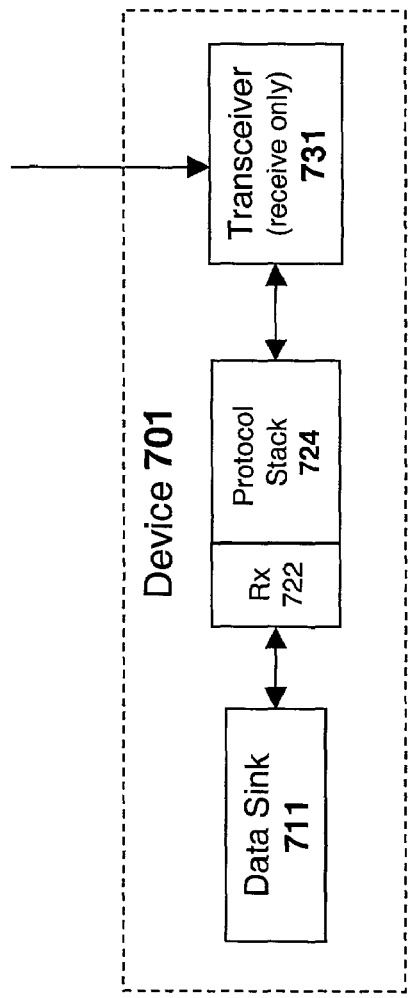
FIG. 7*b* illustrates one embodiment of the invention including a receive-only Bluetooth device.

Similarly, referring to FIG. 7b, a wireless device 701 according to one embodiment of the invention is comprised of a data sink 711 and a protocol stack 724 for supporting the data sink 711 (including a data receive component 722). In contrast to the transmit-only device 700, the transceiver 731 in the illustrated embodiment is configured as a receive-only transceiver (i.e., it is only capable of receiving data and not transmitting data). Once again, because all unnecessary hardware and software (i.e., hardware and software associated with transmitting data) are removed from the embodiment illustrated in FIG. 7b, significant cost savings are realized. Moreover, as with the transmit-only device 300, the hardware footprint and memory requirements for the receive-only device 301 are significantly reduced.

It is important to note that the apparatus and method described herein may be implemented in environments other than a physical integrated circuit ("IC"). For example, the circuitry may be incorporated into a format or machine-readable medium for use within a software tool for designing a semiconductor IC. Examples of such formats and/or media include computer readable media having a VHSIC Hardware Description Language ("VHDL") description, a Register Transfer Level ("RTL") netlist, and/or a GDSII description with suitable information corresponding to the described apparatus and method.

Throughout the foregoing description, for the purpose of explanation, numerous specific details were set forth in order to provide a thorough understanding of the invention. It will be apparent, however, to one skilled in the art that the invention may be practiced without some of these specific details. For example, while the embodiments described above focused on the Bluetooth protocol, many of the underlying principles of the invention may practiced using various other types of wireless and terrestrial protocols. Accordingly, the scope and spirit of the invention should be judged in terms of the claims which follow.

What is claimed is:

1. A transmit-only apparatus comprising:
    a protocol stack compatible with a protocol standard for local wireless communication, the protocol stack comprising selected portions of the protocol standard used for transmitting data; and
    a transceiver communicatively coupled to said protocol stack, wherein:
        the transceiver is operable to wirelessly transmit to a second apparatus a synchronization packet at a radio frequency within a predetermined frequency band, the synchronization packet usable to synchronize data transmissions;
        the transceiver is operable to wirelessly transmit to the second apparatus a first data packet at a radio frequency within the predetermined frequency band, wherein:
            the first data packet is associated with a first priority level; and
            the first data packet is transmitted after the synchronization packet by a first predetermined offset corresponding to the first priority level;
        the transceiver is operable to wirelessly transmit to the second apparatus a second data packet at a radio frequency within the predetermined frequency band, wherein:

the second data packet is associated with a second
priority level; and
the second data packet is transmitted after the synchronization packet by a second predetermined offset corresponding to the second priority level; and
the first and second predetermined offsets are usable by the second apparatus to determine the respective priority levels of the respective data packets.

2. The transmit-only apparatus as in claim 1 further comprising a wireless keyboard enclosure within which said protocol stack and said transceiver are configured.

3. The transmit-only apparatus as in claim 1 further comprising a mouse enclosure within which said protocol stack and said transceiver are configured.

4. The transmit-only apparatus as in claim 1 further comprising a data source operable to generate the first data packet.

5. The transmit-only apparatus as in claim 1 wherein the synchronization packet is usable by the second apparatus to synchronize data transmissions between the transceiver and the second apparatus.

6. The transmit-only apparatus as in claim 1 wherein said protocol stack is configured to cause said transceiver to transmit the first data packet twice in succession within a predetermined window of time.

7. The transmit-only apparatus as in claim 6 wherein said predetermined window of time is 8.33 msec.

8. The transmit-only apparatus as in claim 6 wherein said transceiver is further operable to transmit the first data packet twice at two different frequencies.

9. A receive-only apparatus comprising:
a protocol stack compatible with a protocol standard for local wireless communication, the protocol stack comprising selected portions of the protocol standard used for receiving data; and
a transceiver communicatively coupled to said protocol stack, wherein:
the transceiver is operable to receive from a second apparatus a synchronization packet wirelessly transmitted at a radio frequency within a predetermined frequency band, the synchronization packet usable to synchronize data transmissions;
the transceiver is operable to receive from the second apparatus a first data packet wirelessly transmitted at a radio frequency within the predetermined frequency band, wherein:
the first data packet is associated with a first priority level;
the first data packet is received after the synchronization packet by a first predetermined offset corres p ondin to the first priority level;
the transceiver is operable to receive from the second apparatus a second data packet wirelessly transmiffed at a radio frequency within the predetermined frequency band, wherein:
the second data packet is associated with a second priority level;
the second data packet is received after the synchronization packet by a second predetermined offset corresponding to the second priority level; and
the first and second predetermined offsets are usable by the receive-only apparatus to determine the respective priority levels of the respective data packets.

10. The receive-only apparatus as in claim 9 further comprising a personal computer within which said protocol stack and said transceiver are configured.

11. The receive-only apparatus as in claim 9 further comprising a data sink operable to process the first data packet.

12. The receive-only apparatus as in claim 9 wherein the receive-only apparatus further comprises synchronization logic configured to synchronize data transmissions between said receive-only apparatus and the second apparatus.

13. A method comprising:
generating a first data packet and a second data packet, wherein:
the first data packet is associated with a first priority level and
the second data packet is associated with a second priority level;
transmitting to a receiving device a synchronization packet usable to synchronize data transmissions, the synchronization packet transmitted wirelessly at a radio frequency within a predetermined frequency band;
wirelessly transmitting to the receiving device the first data packet and the second data packet at a radio frequency within the predetermined frequency band, wherein:
the first data packet is transmitted after the synchronization packet by a first predetermined offset corresponding to the first priority level;
the second data packet is transmitted after the synchronization packet by a second predetermined offset correspondiniz to the second priority level; and
the first and second predetermined offsets are usable by the receiving device to determine the respective priority levels of the respective data packets.

14. The method as in claim 13 wherein:
the synchronization packet and the first data packet are transmitted from a transmit-only device; and
the transmit-only device includes a transceiver configured to physically transmit the first data packet.

15. The method as in claim 14 wherein said transmit-only device is a wireless keyboard enclosure within which said transceiver is configured.

16. The method as in claim 14 wherein said transmit-only device is a wireless mouse within which said transceiver is configured.

17. The method as in claim 13 wherein the synchronization packet and the first data packet are transmitted from a transmit-only device.

18. The method as in claim 17 further comprising:
synchronizing data transmissions between said transmit-only device and the receiving device, the synchronization based at least in part on the synchronization packet.

19. The method as in claim 18 further comprising:
transmitting the first data packet twice in succession within a predetermined window of time.

20. The method as in claim 19 wherein the predetermined window of time is 8.33 msec.

21. A transmit-only apparatus comprising:
a transmit-only protocol stack compatible with a protocol standard for local wireless communication, the transmit-only protocol stack having removed therefrom protocol elements related to receiving data; and
a transceiver communicatively coupled to said transmit-only protocol stack, wherein:
the transceiver is operable to wirelessly transmit to a second apparatus a synchronization packet at a radio frequency within a predetermined frequency band, the synchronization packet usable to synchronize data transmissions;

the transceiver is operable to wirelessly transmit to the second apparatus a first data packet at a radio frequency within the predetermined frequency band, wherein:
the first data packet is associated with a first priority level; and
the first data packet is transmitted after the synchronization packet by a first predetermined offset corresponding to the first priority level;
the transceiver is operable to wirelessly transmit to the second apparatus a second data packet at a radio frequency within the predetermined frequency band, wherein:
the second data packet is associated with a second priority level; and
the second data packet is transmitted after the synchronization packet by a second predetermined offset corresponding to the second priority level; and
the first and second predetermined offsets are usable by the second apparatus to determine the respective priority levels of the respective data packets.

22. The transmit-only apparatus as in claim 21 further comprising a wireless keyboard enclosure within which said transmit-only protocol stack and said transceiver are configured.

23. The transmit-only apparatus as in claim 21 further comprising a mouse enclosure within which said transmit-only protocol stack and said transceiver are configured.

24. The transmit-only apparatus as in claim 21 further comprising a data source operable to generate the first and second data packets.

25. The transmit-only apparatus as in claim 1 wherein the protocol standard is a Bluetooth protocol standard.

26. The transmit-only apparatus as in claim 5 wherein the first predetermined offset is usable by the second apparatus to identify the transmit-only apparatus.

27. The receive-only apparatus as in claim 9 wherein the protocol standard is a Bluetooth protocol standard.

28. The receive-only apparatus as in claim 9 wherein the receive-only apparatus is operable to periodically allocate a timing window for receiving at least one synchronization packet.

29. The receive-only apparatus as in claim 12 wherein the first predetermined offset is usable by the receive-only apparatus to identify the second apparatus.

30. The method as in claim 13 wherein the synchronization packet is generated using a protocol stack compatible with a protocol standard for local wireless communication, the protocol stack comprising selected portions of the protocol standard used for transmitting data.

31. The method as in claim 30 wherein the protocol standard is a Bluetooth protocol standard.

32. The method as in claim 13 wherein
the first predetermined offset is usable by the receiving device to identify the transmit-only wireless device.

33. The transmit-only apparatus as in claim 21 wherein the protocol standard is a Bluetooth protocol standard.

* * * * *